United States Patent [19]

Merving

[11] Patent Number: 5,010,684
[45] Date of Patent: * Apr. 30, 1991

[54] TREE TREATMENT CAPSULE

[75] Inventor: Hans Merving, Bergius vag 4, S-644 00, Torshälla, Sweden

[73] Assignee: Hans Merving, Torshalle, Sweden

[*] Notice: The portion of the term of this patent subsequent to Mar. 6, 2007 has been disclaimed.

[21] Appl. No.: 410,884

[22] Filed: Sep. 22, 1989

Related U.S. Application Data

[63] Continuation-in-part of Ser. No. 393,841, Aug. 7, 1989, Pat. No. 4,905,410, which is a continuation of Ser. No. 184,072, Apr. 20, 1988, abandoned.

[30] Foreign Application Priority Data

Apr. 24, 1987 [SE] Sweden ................................ 8701680

[51] Int. Cl.$^5$ .................................................. A01G 29/00
[52] U.S. Cl. ................................................................ 47/57.5
[58] Field of Search .................... 47/8, 11, 51, 52, 53, 47/57.5

[56] References Cited

U.S. PATENT DOCUMENTS

| | | | |
|---|---|---|---|
| 1,982,975 | 12/1934 | Aiken | 47/57.5 |
| 1,999,458 | 4/1935 | Hollister | 47/57.5 |
| 3,706,161 | 12/1972 | Jenson | 47/57.5 |
| 4,342,176 | 8/1982 | Wolfe | 47/57.5 |
| 4,724,793 | 2/1988 | Sletten | 47/57.5 X |
| 4,854,074 | 8/1989 | Johnson | 47/57.5 |

FOREIGN PATENT DOCUMENTS

| | | | |
|---|---|---|---|
| 891350 | 3/1944 | France | 47/57.5 |
| 8302998 | 3/1985 | Netherlands | 47/57.5 |

Primary Examiner—David A. Scherbel
Assistant Examiner—Jerrold D. Johnson
Attorney, Agent, or Firm—Fleit, Jacobson, Cohn, Price, Holman & Stern

[57] ABSTRACT

A tree treatment capsule is disclosed as including a head element having a shank portion with an internal cavity containing a chemical agent. The internal cavity is sealed by a plug in an end of the shank portion remote from the head element. The head element, shank portion, chemical agent and plug form a self-contained unit which is inserted into a pre-drilled hole in a tree. The shank portion is made of a frangible material so that upon breaking as a result of an impact force applied to the head element, the chemical agent is free to mix with the sap of the tree.

17 Claims, 2 Drawing Sheets

TREE TREATMENT CAPSULE

This application is a continuation-in-part of U.S. Patent application Ser. No. 07/393,841, filed Aug. 7, 1989, now U.S. Patent 4,905,410, which is a continuation of U.S. Patent application Ser. No. 07/184,072, filed Apr. 20, 1988, now abandoned.

BACKGROUND OF THE INVENTION

1. Field of the Invention

This invention relates to a tree treatment capsule for feeding a chemical agent into plants and in particular to a capsule for delivering a chemical agent to the phloem layer of a tree. The chemical agent may be either a herbicide or any other tree destroying agent if the treatment is designed to kill the tree, or a fungicide or other medicant or nutrient if the treatment is designed to cure the tree from a decease or a deficiency.

2. Description of the Prior Art

The prior art relating to implantation treatment of trees involves either injection of a cartridge into the tree without preparing a pre-drilled hole in the tree, or implantation of a capsule in a pre-drilled hole in the tree. Examples of prior art devices for such treatment are set forth below.

U.S. Pat. No. 3,691,683 discloses a cartridge containing a chemical liquid agent where the cartridge is hammered into a tree so that it fractures upon impact. However, the cartridge is inserted only half-way in the tree. Therefore, upon fracture, much of the liquid agent is wasted on the surface of the tree, where it also presents a hazard to the person making the injection.

U.S. Pat. No. 4,308,689 discloses a tree treatment capsule for insertion into a pre-drilled hole in a tree. The capsule is made of a frangible material and contains a liquid agent so that an impact force applied to an end cap of the capsule causes breaking of the capsule. This known capsule is disadvantageous since it begins to break near the bore opening. The capsule thus presents the risk that the liquid agent will be exposed outside the bore opening. The end cap of the known capsule also requires a very complicated structural design which renders the capsule expensive to manufacture

SUMMARY OF THE INVENTION

The present invention concerns a tree treatment capsule adapted for insertion into a bore of a tree and includes a head element, a shank portion attached to the head element and having an internal cavity, a chemical agent disposed in the cavity, and a plug sealingly closing an opening of the shank portion in an end thereof which is remote from the head element. The plug is tapered from a diameter larger than the diameter of the opening to a diameter smaller than the diameter of the opening. The head element, chemical agent and plug form a self-contained capsule which is insertable as a unit into the bore in the tree to a position in the bore where the plug abuts a wall of the bore. In one embodiment, shank portion is made of a frangible material whereby an impact force applied to the head element causes the shank portion to move towards the plug such that the plug expands the opening of the shank portion and breaks it to permit the chemical agent to mix with the sap of the tree. In a second embodiment, a torsional force is applied to the head element to move the shank portion towards the plug.

OBJECT OF THE INVENTION

One object of the present invention is to construct a self-contained tree treatment capsule which is simple and economic.

It is a further object of the invention to construct a self-contained tree treatment capsule which contains a chemical treatment agent and which is capable of being broken in the bore without any risk of exposing the chemical agent outside the bore opening.

Other objects and advantages of the present invention will become apparent from the following description taken in conjunction with the accompanying drawing figures.

DESCRIPTION OF THE PREFERRED EMBODIMENTS

Figure 1:
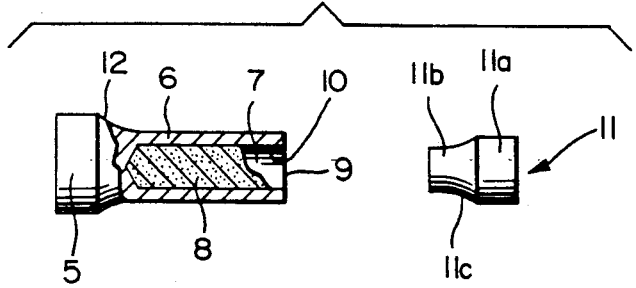
FIG. 1 is an exploded plan view, partly in cross section, of a first tree treatment capsule embodiment according to the present invention.
Figure 2:
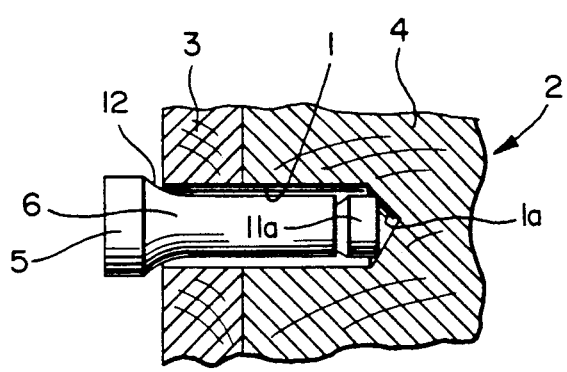
FIG. 2 is a longitudinal plan view of an assembled capsule of FIG. 1 shown in a first stage of insertion in a bore in a tree.

As is illustrated in FIGS. 1 and 2, the present invention is embodied in a tree treatment capsule adapted for insertion into a pre-drilled bore 1 in the trunk of a tree 2 to be treated. As is seen in FIG. 2, the bore 1 is dimensioned to extend through the bark 3 and into the phloem layer 4 of the tree 2. The capsule includes a solid, cylindrical head element 5 having a hollow shank portion 6 rigidly attached thereto, and preferably integrally made with the head element 5. The head element 5 has a diameter larger than the diameter of bore 1, whereas the shank portion 6 has a diameter smaller than the diameter of bore 1.

The shank portion 6 forms an internal cavity 7 for containing a chemical tree treatment agent 8. The shank portion has an open end 9, the opening 10 of which sealingly receives a solid plug 11. In order to provide a superior seal, plug 11 may be adhesively secured in the opening 10. The plug 11 has two cylindrical portions, 11a and 11b. Cylindrical portion 11a has the same diameter as the shank portion 6 whereas the portion 11b has a diameter coinciding with the diameter of the opening 10. The portions 11a and 11b are joined with one another by a tapered transitional portion 11c in order to obtain a tight fit between the portion 11c and the opening 10. The portions 11a, 11b and 11c are preferably made integrally with one another.

The total length of the assembled capsule is preferably slightly larger than the length of bore 1 such that part of the head element 5 will protrude outside the opening of bore 1 when the capsule is fully inserted into the bore, as is shown in FIG. 2.

The head element 5 is joined to the shank portion 6 by a tapered, solid transitional portion 12 in order to obtain a tight fit between the portion 12 and the opening of bore 1. The head element 5, transitional portion 12 and shank portion 6 are preferably made integrally with one another.

The taper of the portions 11c and 12 may be either curved or straight.

All details of the capsule are made of a hard, brittle, breakable and non-elastic material, such as, for instance, wood or fiber wood, or of brittle, breakable plastic material.

The chemical agent may be of any known kind, for instance a herbicide or a fungicide. According to the invention the chemical agent may be in the form of a tablet or a powder. Alternatively, it may be in a pasty-like or liquid form.

Figure 3:
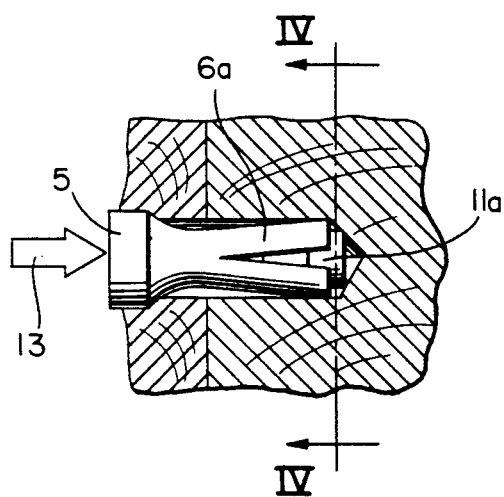
FIG. 3 is a longitudinal plan view of an assembled capsule of FIG. 1 shown in a second stage of insertion in the bore in the tree.
Figure 4:
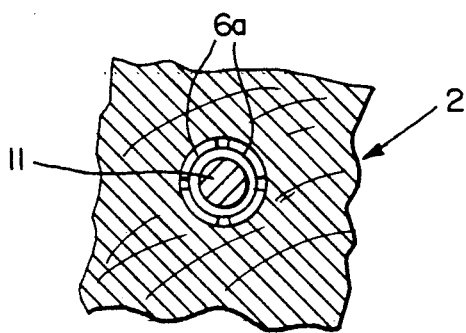
FIG. 4 is a cross sectional view, taken along line IV—IV of FIG. 3.

In order to assemble the capsule, the chemical agent 8 is introduced into the cavity 7 and the plug 11 attached to seal the opening 10. The capsule is thereafter inserted into the bore 1 until the plug 11 abuts a wall of the bore 1, for instance its bottom wall 1a, as is shown in FIG. 2. Thereafter, an impact force is applied, for instance by hammering, as shown by arrow 13, to the head element 5 causing it and the shank portion 6 to move towards the plug 11 such that the shank portion 6 climbs up along the taper of the plug 11 and the plug 11 expands the opening 10 and breaks the shank portion 6 into tongues 6a, as is shown in FIGS. 3 and 4. The tongues 6a form therebetween passages to permit the chemical agent 8 to mix with the sap of the tree 2.

Since the diameter of the head element 5 is larger than the diameter of bore 1, a very tight fit will be obtained between the head element 5 and the opening of bore 1. This will hold the capsule very firmly in the bore 1. The tongues 6a will also exert pressure against the side walls of the bore 1, thus contributing to retaining the capsule firmly in the bore.

Figure 5:
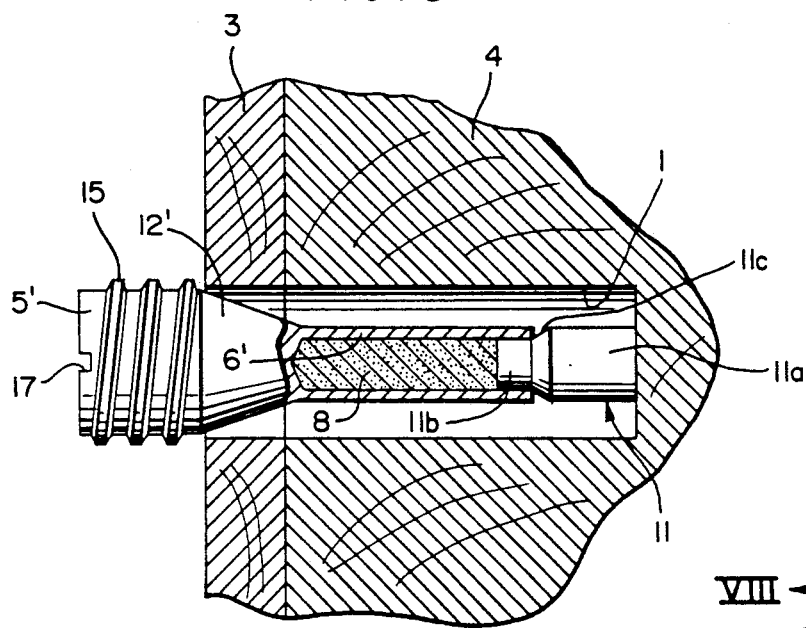
FIG. 5 is a longitudinal plan view of a second tree treatment capsule embodiment according to the present invention, before its insertion into a bore in a tree.
Figure 6:
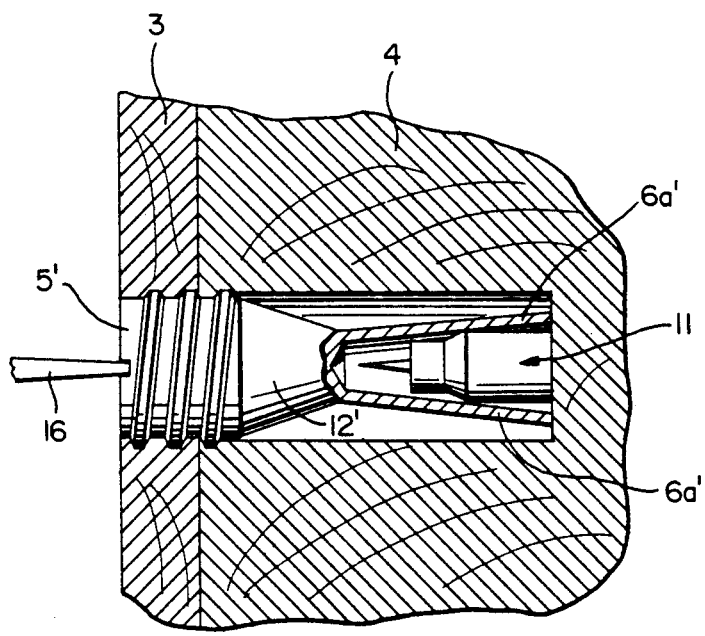
FIG. 6 is a longitudinal plan view of the second capsule embodiment after it has been fully inserted into the bore.

Referring now to the second tree treatment capsule embodiment shown in FIGS. 5 and 6, it should first be noted that similar reference numbers have been used to designate elements of the second embodiment which are the same as or similar to elements of the first embodiment described above. Head 5' of the second capsule embodiment differs, however, from previously described head element 5 in that a wide screw thread 15 having a large pitch is preferably integrally formed with the head element and disposed about the circumferential exterior thereof. In a manner similar to the previously described embodiment, head 5' is preferably joined to shank 6' by a tapered, solid transitional portion 12'. In this embodiment, however, portion 12' simply aids in centering the capsule in bore 1, as will become clear.

In order to cause head 5' and shank 6' to move towards solid plug 11 in the second embodiment, a screw action rather than an impact force is utilized. In particular, a driving tool 16, such as a screwdriver or the like, is inserted into a corresponding notch or other tool receiving recess 17 formed in the end of head 5' protruding from bore 1. It should be noted that any particular driving tool and corresponding recess will be suitable so long as torsional force can be transmitted from the driving tool to head 5' by the recess. To move the head and shank towards plug 11, torsional force is applied to head 5' by twisting driving tool 15 after its insertion in notch 16. Driving tool 15 is simultaneously forced towards solid plug 11 so that thread 15 digs into bark 3 and phloem layer 4, thereby drawing head element 5' into bore 1. As head element 5' is drawn into bore 1, hollow shank 6' is moved towards plug 11 such that the shank climbs up along the taper of plug 11 and the plug expands the opening and breaks the shank portion into tongues 6a', as FIG. 6 illustrates. These tongues 6a' form passages therebetween to permit the chemical agent to mix with the sap of tree 2 in a manner similar to tongues 6a of the first tree treatment capsule embodiments.

As was the case with the first tree treatment capsule embodiment, all parts of the second tree treatment capsule embodiment can be made, for example, of wood or of plastic material. In the event the tree treatment capsule is to be made of plastic, it is preferably to form shank 6 or 6' of a brittle, easily breakable plastic material, such as polystyrene. This assures that shank 6 or 6' will break without requiring an excessive impact or torsional force application. However, in order o to effect a better seal between head 5 or 5' and the outer end of bore 1, and thereby lessen the likelihood that a mixture of chemical agent 8 and sap of the tree will leak out of the bore past the head, it is preferable to make head 5 or 5' of a somewhat more flexible or pliable material than polystyrene. A butadiene-styrene copolymer, for example, is suitable for use as the material from which head 5 is formed. Plug 11 can be formed of either polystyrene of a butadiene-styrene copolymer.

Figure 7:
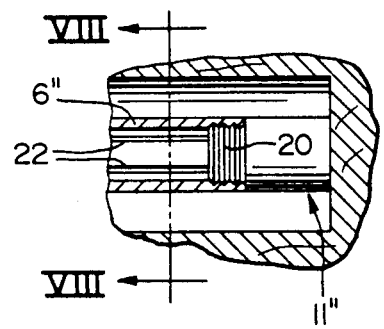
FIG. 7 is a partial longitudinal view of an alternative plug and shank portion construction which can be used with either the first or second tree treatment capsule embodiment.
Figure 8:
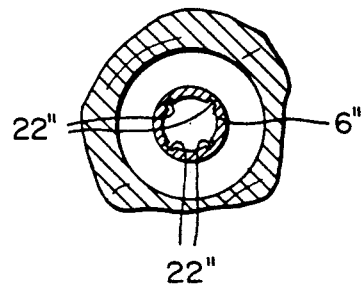
FIG. 8 is a cross sectional view, taken along line VIII—VIII of FIG. 7.

Referring now to FIGS. 7 and 8, an alternative plug and shank portion construction is illustrated. Referring to FIG. 7, a plug 11" is shown as having end 20 with fine, low pitch threads disposed about the circumference thereof. End 20 is engaged by the screw threads with the opening of shank 6". Such a threaded connection between the plug and the open end of the shank helps to prevent the tree treatment agent from escaping from the interior of the capsule.

As FIG. 7 and 8 show, the radially interior surface of shank 6" is provided with longitudinally extending, recessed score lines or slots 22". As the head element of the capsule is forced into bore 1 towards plug 11" by either an impact or a torsional force as previously described, rather than being broken into tongues, shank 6" will be broken along slots 22, and chemical agent 8 will be released through the broken slots.

Various modifications to the particular constructions described above will be apparent to those skilled in the art. Such modifications are intended to be covered by the appended claims.

I claim:

1. A tree treatment capsule for insertion into a bore in a tree comprising:
    a head element,
    a shank portion of smaller diameter integrally formed with said head element by a tapered portion, said shank portion having an internal cavity,
    a chemical agent for treating a tree disposed in said internal cavity;
    said shank portion having an end remote from said head element, said end having an opening for said internal cavity,
    a tapered plug sealingly closing said opening, said plug being tapered from a diameter larger than the diameter of said opening to a diameter smaller than the diameter of said opening such that said plug is only partially insertable into said opening in order to obtain a tight fit between said plug and said opening, said head element, said shank portion, said chemical agent and said plug forming a self-contained capsule which is insertable as a unit into a bore in a tree having a diameter greater than the diameter of the shank portion and a length shorter than the length of the capsule so that when inserted into the tree, said plug abuts an end wall of the bore, said shank portion being frangible so that when a force is applied to said head element to move said shank portion towards said plug, said plug expands said opening and breaks said shank portion to enable the chemical agent to pass out of the shank portion into an annular space defined between the shank portion and the bore to mix with the tree sap, said capsule, when fully inserted into the bore having the head element seal the bore to prevent any leakage of the chemical agent from the bore.

2. A tree treatment capsule as defined by claim 1, wherein said shank portion is formed of polystyrene material.

3. A tree treatment capsule as defined by claim 1, wherein said head element is formed of a copolymer of butadiene and styrene.

4. A tree treatment capsule as defined by claim 1, and further comprising a screw thread disposed about the circumferential exterior of said head element.

5. A tree treatment capsule as defined by claim 4, wherein the plug is threaded into the open end of the shank portion.

6. A tree treatment capsule as defined by claim 1, wherein the shank portion is longitudinally scored.

7. A tree treatment capsule inserted into a bore in a tree as defined by claim 1, wherein said shank portion is formed of polystyrene material.

8. A tree treatment capsule inserted into a bore in a tree as defined by claim 1, wherein said head element is formed of a copolymer of butadiene and styrene.

9. A tree treatment capsule inserted into a bore in a tree as defined by claim 1, and further comprising a screw thread disposed about the circumferential exterior of said head element.

10. A method of treating a tree comprising the steps of:
providing a tree treatment capsule including a head, a frangible shank of smaller diameter then the head integrally formed with said head and having an internal cavity, the portion of the capsule between the head and the shank being tapered, a chemical agent disposed in said internal cavity, and a tapered plug in an opening of said internal cavity at an end of said shank portion remote from said head, said plug sealingly closing said opening and retaining said chemical agent in said internal cavity,
forming in a tree a bore having a diameter larger than the diameter of the shank and smaller than the diameter of the head and having a length less than the length of the capsule and plug,
inserting said tree treatment capsule into the bore formed in said tree so that said plug abuts an end wall of said bore with the head projecting from the bore, forcing said head to move into the bore with said head and said shank moving towards said plug until the capsule is fully inserted into the bore, when the capsule is fully inserted into the bore, the head to closing off and sealing said bore, and the shank being split releasing said chemical agent from said internal cavity into an annular space defined between the diameter of the bore and into the diameter of the shank said chemical agent mixing with sap of the tree, and leakage of said chemical agent from said bore being prevented by the seal provided by the head of the capsule.

11. A method according to claim 10 wherein the capsule is composed of plastic material.

12. A method according to claim 10 wherein the plastic material comprises polystyrene.

13. A method according to claim 10 wherein the plastic material for the shank is polystyrene and for the head is a copolymer of polystyrene and butadiene.

14. A method according to claim 10 wherein the capsule is threaded into the bore during insertion.

15. A tree treatment capsule inserted into a bore in a tree, the capsule comprising:
a head element,
a shank portion of smaller diameter integrally formed with said head element by a tapered portion, said shank portion having an internal cavity,
a chemical agent for treating the tree disposed in said internal cavity,
said shank portion having an end remote from said head element, said end having an opening for said internal cavity,
a tapered plug sealingly closing said opening,
said plug being tapered from a diameter larger than the diameter of said opening to a diameter smaller than the diameter of said opening such that said plug is only partially insertable into said opening in order to obtain a tight fit between said plug and said opening,
said head element, said shank portion, said chemical agent and said plug forming a self-contained capsule which is inserted as a unit into the bore in the tree having a diameter greater than the diameter of the shank portion and a length shorter than the length of the capsule so that when inserted into the tree, said plug abuts an end wall of the bore, said shank portion being frangible so that when a force is applied to said head element to move said shank portion towards said plug, said plug expands said opening and breaks said shank portion to enable the chemical agent to pass out of the shank portion into an annular space defined between the shank portion and the bore to mix with the tree sap, said capsule being fully inserted into the bore with the head element sealing the bore to prevent any leakage of the chemical agent from the bore.

16. A tree treatment capsule inserted into a bore in a tree as defined by claim 15, wherein the plug is threaded into the end of the shank portion.

17. A tree treatment capsule inserted into a bore in a tree as defined by claim 15, wherein the shank portion is longitudinally scored.

* * * * *